(12) United States Patent
Juzswik et al.

(10) Patent No.: US 9,948,762 B2
(45) Date of Patent: Apr. 17, 2018

(54) COMMUNICATION INTEGRATION VIA SHORT RANGE WIRELESS CONNECTIVITY RELAY

(71) Applicant: GM Global Technology Operations LLC, Detroit, MI (US)

(72) Inventors: Karen Juzswik, Ypsilanti, MI (US); Robert A. Hrabak, West Bloomfield, MI (US); Wen Gu, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/150,942

(22) Filed: May 10, 2016

(65) Prior Publication Data
US 2017/0331936 A1  Nov. 16, 2017

(51) Int. Cl.
| H04B 7/00 | (2006.01) |
| H04M 1/725 | (2006.01) |
| H04W 4/00 | (2018.01) |
| H04B 1/3822 | (2015.01) |
| H04B 1/3877 | (2015.01) |
| H04B 5/00 | (2006.01) |

(52) U.S. Cl.
CPC ........ *H04M 1/7253* (2013.01); *H04B 1/3822* (2013.01); *H04B 1/3877* (2013.01); *H04B 5/0031* (2013.01); *H04W 4/008* (2013.01)

(58) Field of Classification Search
CPC ........... H04M 1/7253; H04M 2250/02; H04W 4/008; H04W 88/18; H04W 88/06; H04W 76/02; H04B 1/3877; H04B 5/0031
USPC ......... 455/41.1, 41.2, 418–420, 422.1, 575.9
See application file for complete search history.

(56) References Cited

U.S. PATENT DOCUMENTS

| 8,432,260 | B2 | 4/2013 | Talty et al. | |
| 2013/0332007 | A1* | 12/2013 | Louboutin | H04W 4/021 701/2 |
| 2014/0134949 | A1* | 5/2014 | Sakata | H04M 1/7253 455/41.2 |
| 2016/0197782 | A1* | 7/2016 | Hort | H04L 41/0809 709/222 |
| 2016/0227284 | A1* | 8/2016 | Ordille | H04N 21/478 |

* cited by examiner

*Primary Examiner* — Nhan Le
(74) *Attorney, Agent, or Firm* — David Willoughby; Reising Ethington P.C.

(57) ABSTRACT

A system and method for providing wireless communication between a handheld mobile device and an embedded vehicle system of a motor vehicle. The system includes a communication module that utilizes at least two different short range wireless communication technologies to facilitate communication and/or pairing of an occupant's smartphone or other mobile device with an embedded vehicle system such as a vehicle infotainment system. This includes the use of a very short range communication technology, such as Near Field Communication (NFC), to communicate between the mobile device and an embedded vehicle system that is located outside of the operational range of the NFC or other very short range communication technology used by the mobile device.

15 Claims, 4 Drawing Sheets

COMMUNICATION INTEGRATION VIA SHORT RANGE WIRELESS CONNECTIVITY RELAY

TECHNICAL FIELD

The present invention relates to a method and system for communications between and infotainment system within a motor vehicle and portable electronic devices.

BACKGROUND

Mobile devices such as smart phones and tablets have made the Internet, information, and entertainment available to users anywhere at any time. Users of these devices may desire to interface them with infotainment systems built into motor vehicles. Doing so allows audio, photos, video, or websites (each of which is a type of "content" or "multimedia content") to be played or presented within the vehicle using the infotainment system, whether it be a central infotainment system (e.g., front instrument panel screen or vehicle audio system) or just a personal infotainment system (e.g., headrest or seat back-mounted video screen). More than one occupant of the passenger compartment may have a mobile device and all of the mobile devices may attempt to communicate with the infotainment system(s). Compounding this communications issue is the fact that any one occupant within a motor vehicle may have one or more of these devices.

Each of these devices may need to be "paired" with the infotainment system of the motor vehicle. Pairing protocols tend to be cumbersome for passengers in a passenger compartment of a motor vehicle. Security measures require sharing encryption keys between devices—this leads to a process that is often found to be confusing or problematic to the device users. This problem is not only related to one type of electronic communication as every protocol regarding connectivity includes some form of security if not to prevent unauthorized use, then to prevent inadvertent connections which may consume sections of valuable bandwidth.

SUMMARY

According to an embodiment of the invention, there is provided a method for providing wireless communication between a handheld mobile device and an embedded vehicle system of a motor vehicle, wherein the vehicle includes a communication module configured to carry out wireless communication with the mobile device using a first communication channel and to carry out wireless communication with the embedded vehicle system using a second communication channel. The method comprises the steps of:

(a) detecting the presence of the mobile device in the vehicle using the communication module of the motor vehicle;

(b) establishing the first communication channel with the mobile device using wireless communication between the communication module and mobile device according to a first protocol that supports the transmission of data comprising (i) commands, (ii) information, (iii) media content, or any combination of (i), (ii), and (iii) over the first communication channel;

(c) establishing the second communication channel between the communication module and the embedded vehicle system using wireless communication according to a second, different protocol that supports the transmission of the data over the second communication channel; and (d) transferring at least some of the data between the mobile device and the embedded vehicle system via communication between the communication module and mobile device over the first communication channel using the first protocol and via communication between the communication module and the embedded vehicle system over the second communication channel using the second, different protocol.

According to another embodiment of the invention, there is provided a method for providing wireless communication between a mobile device and an infotainment system of a motor vehicle, wherein the vehicle includes a communication module configured to carry out wireless communication with the mobile device using a first communication channel that utilizes a first protocol and to carry out wireless communication with the infotainment system using a second communication channel that utilizes a second, different protocol. The method comprises the steps of:

establishing the first communication channel between the mobile device and the communication module of the motor vehicle using the first protocol;

obtaining an identifier of the mobile device at the communication module using the first communication channel;

transmitting the identifier of the mobile device from the communication module to the infotainment system using the second communication channel;

authorizing the mobile device for use with the infotainment system using the identifier of the mobile device received from the communication module; and wirelessly communicating with the mobile device using infotainment system based on the authorization.

In accordance with yet another embodiment of the invention, there is provided a communication module for providing wireless communication between a mobile device and a motor vehicle. The communication module comprises an electronic hardware module that includes first and second communication devices that communicate wirelessly over respective first and second communication channels using different first and second protocols, respectively. The first communication device includes a first short range wireless communication (SRWC) circuit having wireless transmitter and receiver circuitry that utilizes a first SRWC technology and that is configured to send and receive data communications using the first protocol via the first communication channel. The second communication device includes a second SRWC circuit having wireless transmitter and receiver circuitry that utilizes a second SRWC technology and that is configured to send and receive data communications using the second protocol via the second communication channel. The first SRWC circuit has a shorter operational range distance than the second SRWC circuit. The first and second communication devices are hardwired together to communicate data received wirelessly by one of the first and second communication devices to the other of the first and second communication devices over the hardwired connection. Data received wirelessly from one of the mobile device and motor vehicle over one of the first and second communication channels is transmitted wirelessly to the other of the mobile device and motor vehicle over the other of the first and second communication channels.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Described below are embodiments of a system and method for providing wireless communication between a handheld mobile device and an embedded vehicle system of a motor vehicle. In general, the disclosed embodiments enable use of at least two different short range wireless communication (SRWC) technologies to facilitate communication and/or pairing of an occupant's smartphone or other mobile device with an embedded vehicle system such as a vehicle infotainment system. This includes the use of a very short range communication technology, such as Near Field Communication (NFC), to communicate between the mobile device and embedded vehicle system that is located outside of the operational range of the very short range communication technology used by the mobile device. For example, the system and method may use a communication module located adjacent the mobile device to pass communications between the mobile device and an infotainment system. To do this, the communication module may utilize, for example, NFC communication with the mobile device and another SRWC technology, such as Bluetooth™ to communicate with the infotainment unit. The use of this secondary wireless connection from the communication module to the infotainment system enables communication between the mobile device and infotainment system without the requirement of additional wiring harnesses between the communication system and the infotainment system.

This pass through of data using the communication module may be done for the purpose of providing media content to the infotainment system from the mobile device, or to pass commands to or from the mobile device to the infotainment system. Alternatively, it may be used for initial pairing of the mobile device with the infotainment system over a second SRWC technology supported by the mobile device, such as Bluetooth™. Once paired, the mobile device and infotainment system may then communicate directly with each other.

Although any suitable SRWC technology can be used to communicate with the mobile device, NFC-enabled devices are becoming more common since it can help simplify the way consumer devices interact with one another. Operating at 13.56 megahertz, and transferring data at up to 424 kilobits per second, NFC provides intuitive, simple and reliable communication between electronic devices. NFC is both a "read" and "write" technology. Communication between two NFC compatible devices occurs when they are brought within close proximity of one another—usually within about two to four centimeters. A simple wave or touch of the devices can establish an NFC connection. The underlying layer of NFC technology follows universally implemented standards of the International Organization of Standardization (ISO). Because the transmission range is so short, NFC enabled communication is inherently secure. Also, physical proximity of the device to the reader gives users the reassurance of being in control of the process.

Figure 1:
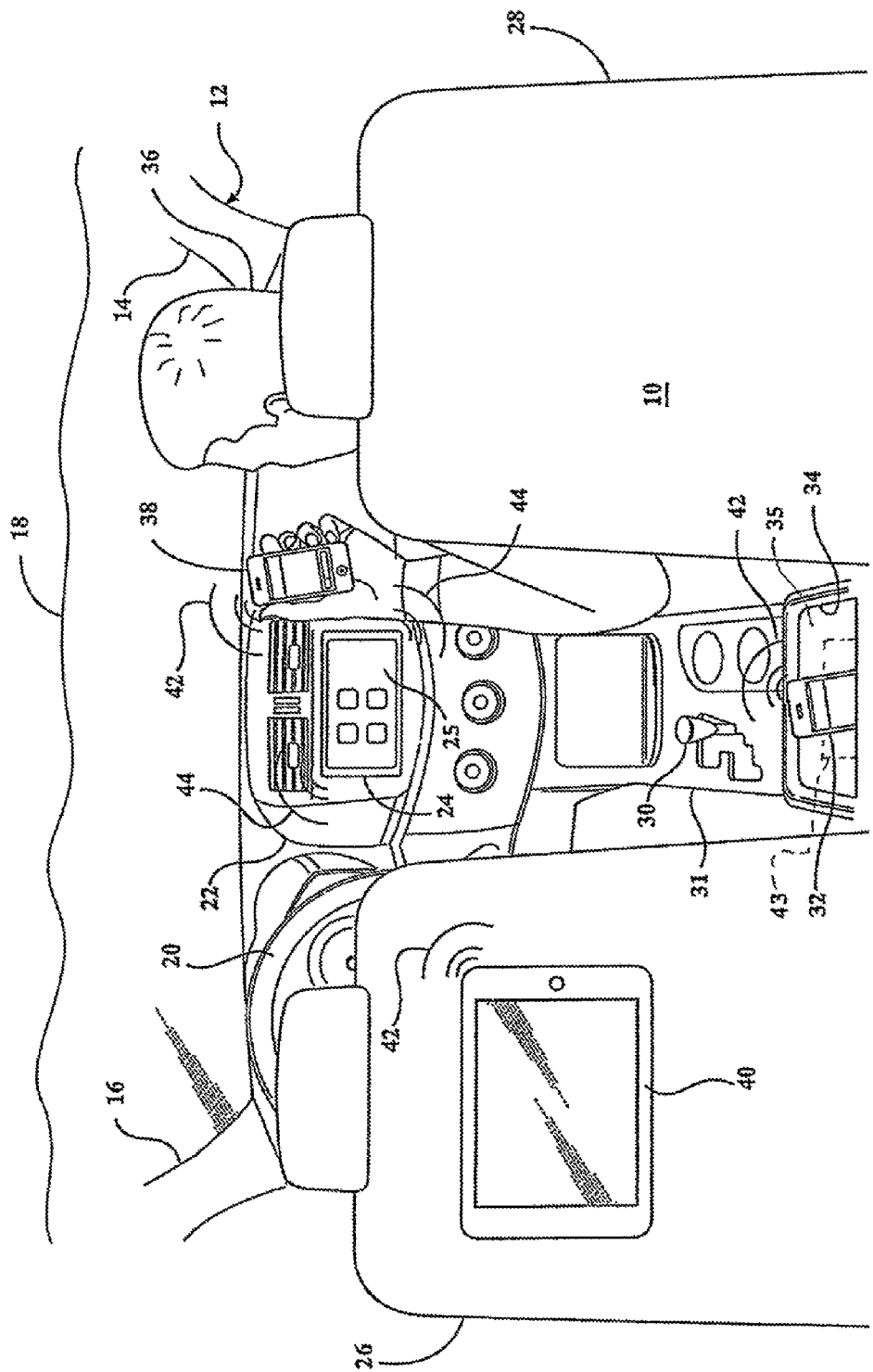
FIG. 1 is a perspective view of a passenger compartment of a motor vehicle including an infotainment system and temporarily housing a plurality of handheld mobile devices.

Referring to FIG. 1, there is shown a forward looking view through a passenger compartment 10 of a motor vehicle, generally indicated at 12, represented by two A pillars 14, 16, a windshield 18 (partially cut away), a steering wheel 20 and an instrument panel 22. The instrument panel 22 houses an infotainment system 24 which is an embedded vehicle system that includes an infotainment HMI display 25 that is visible and accessible in the vehicle for use by occupants. A driver seat 26 and a passenger seat 28 are also shown. A shifter 30, extending through a center console 31, allows a driver (not shown) to shift the transmission of the motor vehicle 12 to the desired driving position to selectively transfer power through the powertrain (not shown) of the motor vehicle 12. A driver's mobile device 32 is shown stored in a storage compartment 34 between the driver seat 26 and the passenger seat 28 resting against a compartment wall 35. A passenger 36 is holding a second mobile device 38 and a third mobile device 40, a tablet is graphically represented as being used by someone (not shown) sitting in a back seat (not shown) of the passenger compartment 10 of the motor vehicle 12. Each of these mobile devices 32, 38, 40 has short range wireless communication (SRWC) circuitry that allows them to wirelessly communicate (graphically represented by the arcuate waves 42) with the vehicle 12 and/or other similarly functioning electronic devices.

Infotainment system 24 includes SRWC circuitry for wireless communication according to one or more protocols, as represented by arcuate waves 44. For example, it may include circuitry for SRWC according to 802.11 and/or other Wi-Fi protocols, as well as other SRWC technologies such as Bluetooth™, whether as Bluetooth™ Low Energy (BLE) or other existing or future Bluetooth™ standards. In at least some embodiments, the infotainment system 24 may use this SRWC for direct communication with any one or more of the mobile devices 32, 38, 40 that may be present within the passenger compartment 10. For vehicles equipped with a telematics unit for wireless communication with devices and system exterior to the vehicle, such as via cellular communication to a PLMN or other wireless telephony system, the infotainment system may send and receive data to/from the telematics unit by either a hardwired or wireless connection.

The storage compartment 34 is a handheld mobile device holder designed to support handheld mobile devices such as a smartphone. In the illustrated embodiment, the mobile device holder 34 includes the compartment wall 35 arranged as a part of the holder 34 such that it is located near or adjacent the mobile device 32 when the mobile device is placed in the holder. For example, as better seen in FIG. 2, the compartment wall 35 can be located such that the mobile device 32 rests against the wall when placed in the holder 34. Located on the other side of compartment wall 35 is a communication module 43 that may be included as a part of manufacturing vehicle 12 or may be added as an aftermarket device. The communication module 43 is configured for SRWC both with the mobile device 32 located in the holder 34, as well as with the infotainment system 24. The communication module 43 may be attached to the wall or may be separately mounted. In other embodiments, it may be located at a different location that is near enough to the holder 34 to be within the operational range of the SRWC technology used to communicate between the mobile device 32 and communication module 43.

Where a very short range wireless technology is used, such as NFC, the compartment wall may be provided with a thickness that is minimized for limiting attenuation of the wireless communication while still providing sufficient structural integrity against being breached under normal conditions expected when used in service by a vehicle operator over the expected useful life of the vehicle. Depending on the materials used, this may involve a compartment wall having a thickness, or a portion of it at the communication module with a thickness, that is as small as 3 mm. Suitable materials and wall thickness for the NFC or other SRWC technology used will be known to those skilled in the art.

The communication module 43 includes a first communication device 45 and a second communication device 46. The first communication device 45 communicates wirelessly over a first communication channel with the mobile device 32 using a first SRWC protocol. The second communication device 45 communicates wirelessly with the infotainment system 24 over a second communication channel using a second SRWC protocol. In the illustrated embodiment, the first communication device 45 is a NFC module, and the second communication device 46 is a Bluetooth™ Low Energy (BLE) module. The NFC module 45 is disposed immediately adjacent the compartment wall 35 of the mobile device holder 34. The BLE module 46 is located directly behind the NFC module 45, thereby positioning the NFC module closely to the mobile device location in the holder 34. The NFC module 45 is functionally connected to the BLE module 46 such that data may be passed between the modules. This may be done by a hardwired connection between the modules 45, 46 over electrical conductors 48, or may be done wirelessly.

The first and second communication devices (modules 45 and 46) may be physically and/or functionally separated devices or may be physically and/or functionally integrated devices. For example, they may be physically separate units with separate housings and circuitry. Or, they may be physically integrated together to form the communication module 43 as a single package, yet have separate circuitry, or may be fully integrated together both physically and functionally using the same circuitry that includes transceivers and electronics configured to communicate using both NFC and Bluetooth™. For example, the communication module 43 may include a single processor along with non-transient computer readable memory storing one or more programs to carry out the pass through of communications through the module 43, as well as separate receivers and transmitters (e.g., transceivers) with their own antennas to carry out the actual NFC and Bluetooth™ wireless communication according to the respective NFC and Bluetooth™ protocols.

In the embodiment shown, the NFC and BLE modules 45 and 46 are integrated together physically, but with substantially separate circuitry. The NFC module 45 comprises NFC circuitry including an MCU 54 which may include an microprocessor or other electronic processor and non-transient computer readable memory storing programs/data for operating the NFC module. It also includes an NFC transceiver 55 and antenna 56. The transceiver 55 may be implemented as a separate transmitter and receiver (which can utilize separate antennas or share a common antenna 56). The NFC antenna 56 may be an LC loop antenna, and the construction and operation of the NFC circuitry and the individual components shown will be known to those skilled in the art.

The BLE module 46 comprises Bluetooth™ circuitry including a processor 57 which may include an microprocessor or other electronic processor and non-transient computer readable memory storing programs/data for operating the BLE module. It also includes a transceiver 58 and antenna 59. The transceiver 58 may be implemented as a separate transmitter and receiver (which can utilize separate antennas or share a common antenna 59). The construction and operation of the Bluetooth™ circuitry and the individual components shown will be known to those skilled in the art. Further, the interconnection and communication of data between the modules 45 and 46 is readily within the level of skill in the art.

As will be appreciated, by locating the communication module 43 at the mobile device holder 24, a very short range wireless technology such as NFC supported by the mobile device may be enabled for use by the vehicle's infotainment system 24 even though that infotainment system is located outside the operational range of the mobile device's NFC or other very short range wireless technology when the mobile device is positioned at the center console or other convenient location within the passenger compartment. And this may be accomplished as shown in the illustrated embodiment by locating the communication module 43 at a position that is within the operational range of the mobile device's NFC or other SRWC technology and within the operational range of the infotainment system's Bluetooth™ or other SRWC technology. That position may be at the mobile device holder 34 as shown, or elsewhere within the passenger compartment 10. This arrangement further avoids the necessity of additional wiring in the vehicle that would otherwise add weight and expense.

In addition, there may be more than one communication module 43 in a particular passenger compartment 10 as is designed by the manufacturer of the motor vehicle 12. For example, there may be a communication module 43 positioned somewhere in a back seat area of the passenger compartment 10 to allow those passengers seated on the back seat to pair or otherwise communicate with the infotainment system 24 easily. The communication module should be located at a position that is within the operational range of the SRWC technology being used and preferably within close enough proximity to avoid loss of communications during use.

Figure 2:
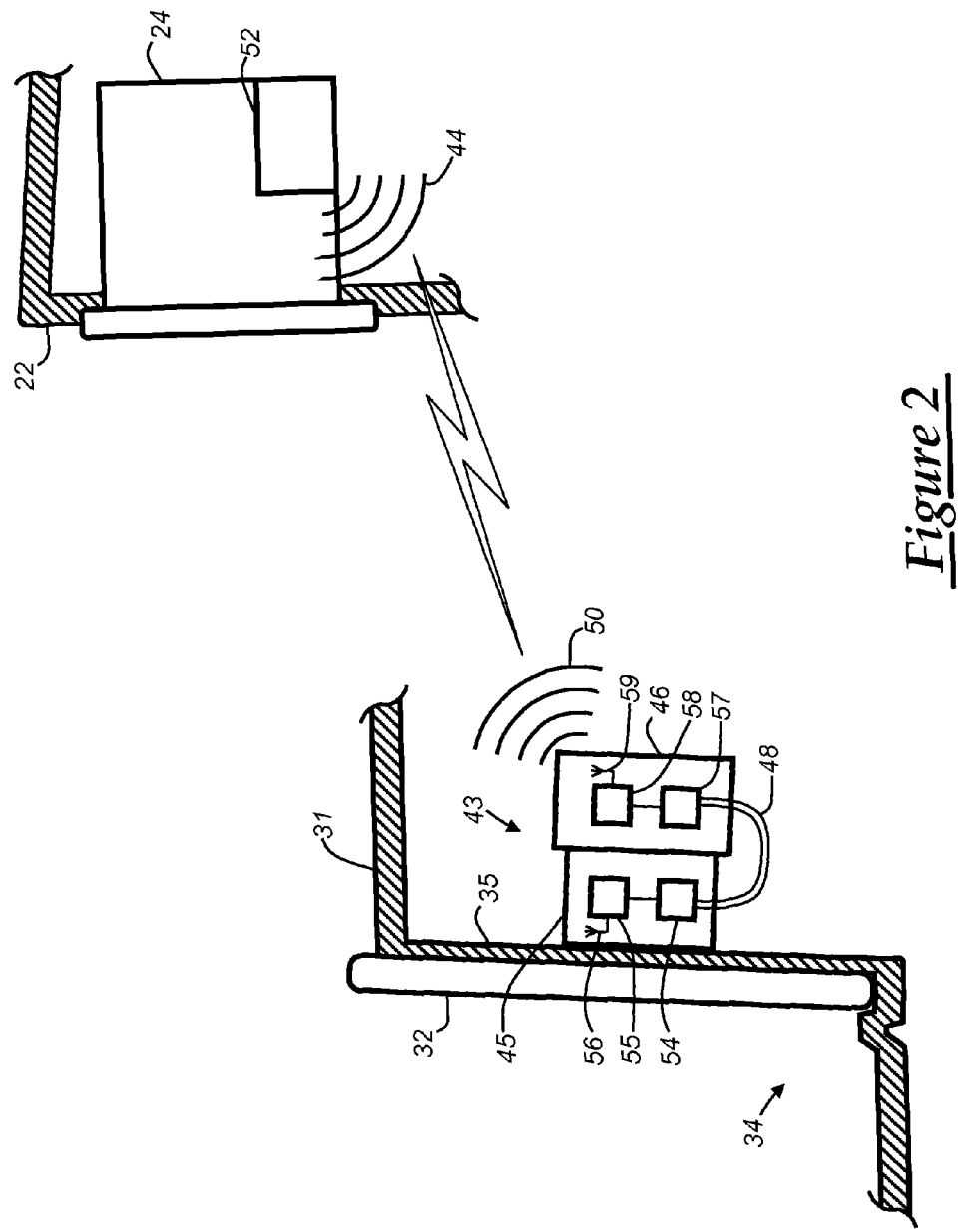
FIG. 2 is a cross-sectional side view of one embodiment of a communication module used in the system of FIG. 1.

As shown in FIG. 2, the infotainment system 24 includes its own communication device 52 that uses the second SRWC protocol to establish the second communication channel with the BLE module 46. For this purpose, the infotainment communication device 52 may be a BLE module having the same construction and operation as that of BLE module 46 described above. Thus, the BLE modules 46 and 52 communicate wirelessly as indicated by the respective arcuate waves 50 and 44 according to the standardized BLE protocol which is known to those skilled in the art. The infotainment BLE module 52 may be housed in the infotainment system 24 behind the instrument panel 22 or located nearby and hardwired to the system 24.

Figure 3:
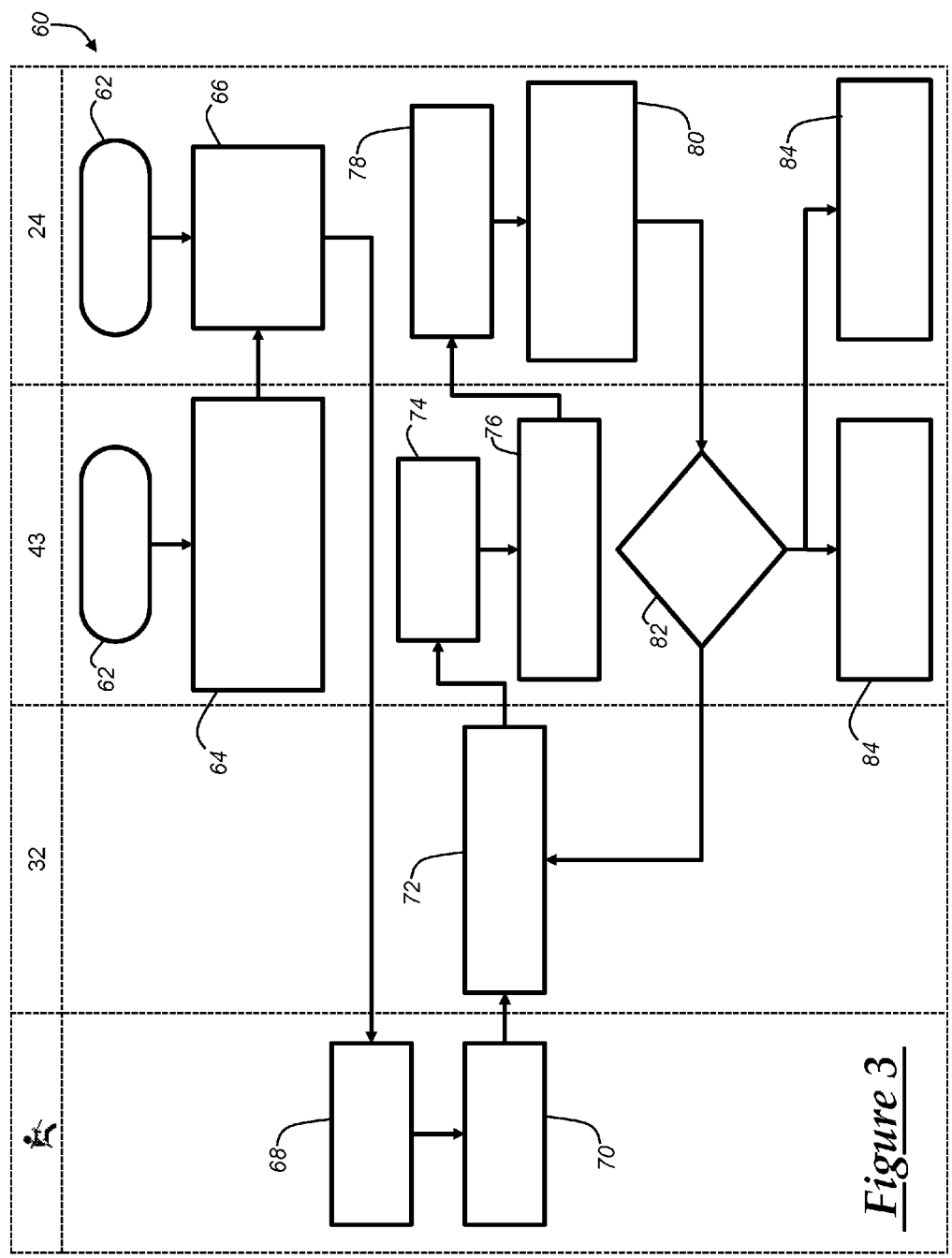
FIG. 3 is a flowchart of an embodiment of the method carried out by the system of FIGS. 1 and 2 for communication between a handheld mobile device and the infotainment system.

Referring to FIG. 3, there is shown a flowchart of a method 60 carried out by the various devices shown in FIGS. 1 and 2. The flowchart is depicted within a matrix used to identify the relative time at which an event occurs and by what device the event is created or acted upon. In some instances, identical flowchart elements are repeated to show that they are being acted on by more than one element. These duplicated flowchart elements will have the same reference character in each instance. For example, the first element of the method 60 is "vehicle built." This element is represented twice within the flowchart because the vehicle is built with both infotainment system 24 and communication module 43, but each representation of this element is identified as 62.

Thus, the method begins with the incorporation of the infotainment system 24 and the communication module 43 into the vehicle at 62. Once the vehicle is built, the vehicle and its infotainment system 24 and communication module 43 are powered up at step 64. The BLE module 46 is configured to become Bluetooth™ discoverable upon power up. The BLE module 52 of infotainment system 24 finds and pairs with the BLE module 46 at step 66. The system is now ready for use by a customer who purchases, leases or otherwise uses the vehicle. Thus, once a user receives the motor vehicle 12 at step 68, the user at step 70 enables the NFC capability on the user's mobile device 32 if not already done. Thereafter, the user may place the mobile device 32 into the holder 34 of the center console 31, thereby locating the mobile device 32 against the wall 35 and adjacent the NFC module 45. This is done at step 72 and brings the mobile device within NFC operating range of the NFC module 45, thereby permitting the NFC module 45 to receive NFC traffic emitted by the mobile device 32.

Once in position, then at step 74 a first communication channel is established between the mobile device 32 and communication module 43; in particular, an NFC communication channel utilizing the NFC protocol is established thereby allowing the NFC traffic to be received by the NFC module 45. Then, the received NFC traffic is used by the BLE module 46 to initiate a second communication channel between BLE module 46 and BLE module 52 of the infotainment system 24. To do this, BLE module 46 first advertises the NFC traffic using its BLE circuitry and protocol, at step 76. Then, at step 78, these BLE advertisements are received by the infotainment system's BLE module 52. In response, the BLE module 52 establishes a Bluetooth™ connection with the BLE module 46 as the second communication channel using the second (Bluetooth™) protocol. This is shown at step 80. If the BLE connection is not successful then, as indicated at step 82, the method loops back to step 72 and continues to attempt to establish the BLE connection either for a number of iterations or an amount of time, or until the mobile device 32 is moved from the holder 34 and out of range of the NFC module 45.

If a Bluetooth™ connection does occur, the NFC traffic is transmitted as Bluetooth™ payloads at 84. Thus, communication has been established between the mobile device 32 and infotainment system 24 using NFC by the mobile device and Bluetooth™ by the infotainment system. The data transmitted between the mobile device 32 and infotainment system 24 may include (i) commands, (ii) information, (iii) media content, or any combination of these, all of which are supported by the NFC and BLE protocols. For example, the mobile device may include an application (app) that sends data such as music or other media content to the infotainment system by way of communication module 43, and the HMI unit of infotainment system 24 may be used to receive a command from a user, such as the selection of a song or music playlist, with that command being sent to the mobile device via the communication module 43 to be carried out by the application on the mobile device.

Rather than using communication module 43 to pass-through data for communication between the mobile device 32 and infotainment system 24, it may instead be used for initial pairing of the mobile device 32 directly with the infotainment system 24 using Bluetooth™ This then establishes a third communication channel directly between the mobile device 32 and infotainment system 24 such that the first and second communication channels using the communication module 43 may be terminated. This process may be useful where an automated, secure, PIN-protected pairing is to be set up between the vehicle 12 and mobile device 32. For example, the NFC and BLE communication that is carried out over the course of steps 72-80 may instead comprise providing a pairing PIN from the mobile device 32 to the infotainment BLE module 52 (or vice-a-versa) that is then used to authorize pairing of the mobile device with the vehicle. The PIN may be at least temporarily stored at the infotainment system and then used in a subsequent pairing process when the mobile device is put in a Bluetooth™ discoverable mode that is detected by the infotainment BLE module 52, and used to automatically pair the mobile device directly with the BLE module 52 without any user interaction other than having put the mobile device 32 into or near the holder 34 and possibly having the user confirm via the device 32 or HMI unit of the infotainment system that the pairing should proceed. In this way, initial, secure pairing of the mobile device with the vehicle may occur automatically without the user having to enter in a PIN themselves. Thereafter, the mobile device 32 and infotainment system 24 may communicate directly with each other without the use of communication module 43.

The method may be varied as desired or necessary for a particular implementation. For example, establishing the first (NFC) communication channel in step 74 could be carried out after establishing the second (BLE) communication channel in step 80, such as where the second communication channel is established initially at vehicle powerup and maintained during operation of the vehicle independently of whether or not any NFC channel is established with the communication module 43. Alternatively, the second communication channel may be established in response to establishing the first (NFC) communication channel or in response to detecting the presence of the mobile device in the vehicle via the NFC traffic or otherwise.

In one embodiment, an identifier of the mobile device is received from the mobile device 32 by the NFC module 45 and passed to the infotainment system 24 via the BLE modules 46 and 52 via the first and second communication channels. This identifier may then be used by the infotainment system in various ways; for example, to display the identifier on the HMI display 25 such as to allow the user to verify which device is connected and providing data or other content to the infotainment system. The infotainment system 24 may also use this mobile device identifier to authorize the mobile device for use with the infotainment system by, for example, comparing the identifier with a stored list of authorized identifiers or by displaying the identifier on the HMI display 25 and receiving a user selection of the identifier that indicates the device is authorized to provide content to the infotainment for presentation in the vehicle passenger compartment 10. Thereafter, the infotainment system 24 may wirelessly communication with the mobile device 32 either via the communication module 43 or directly via BLE or some other SRWC technology.

Figure 4:
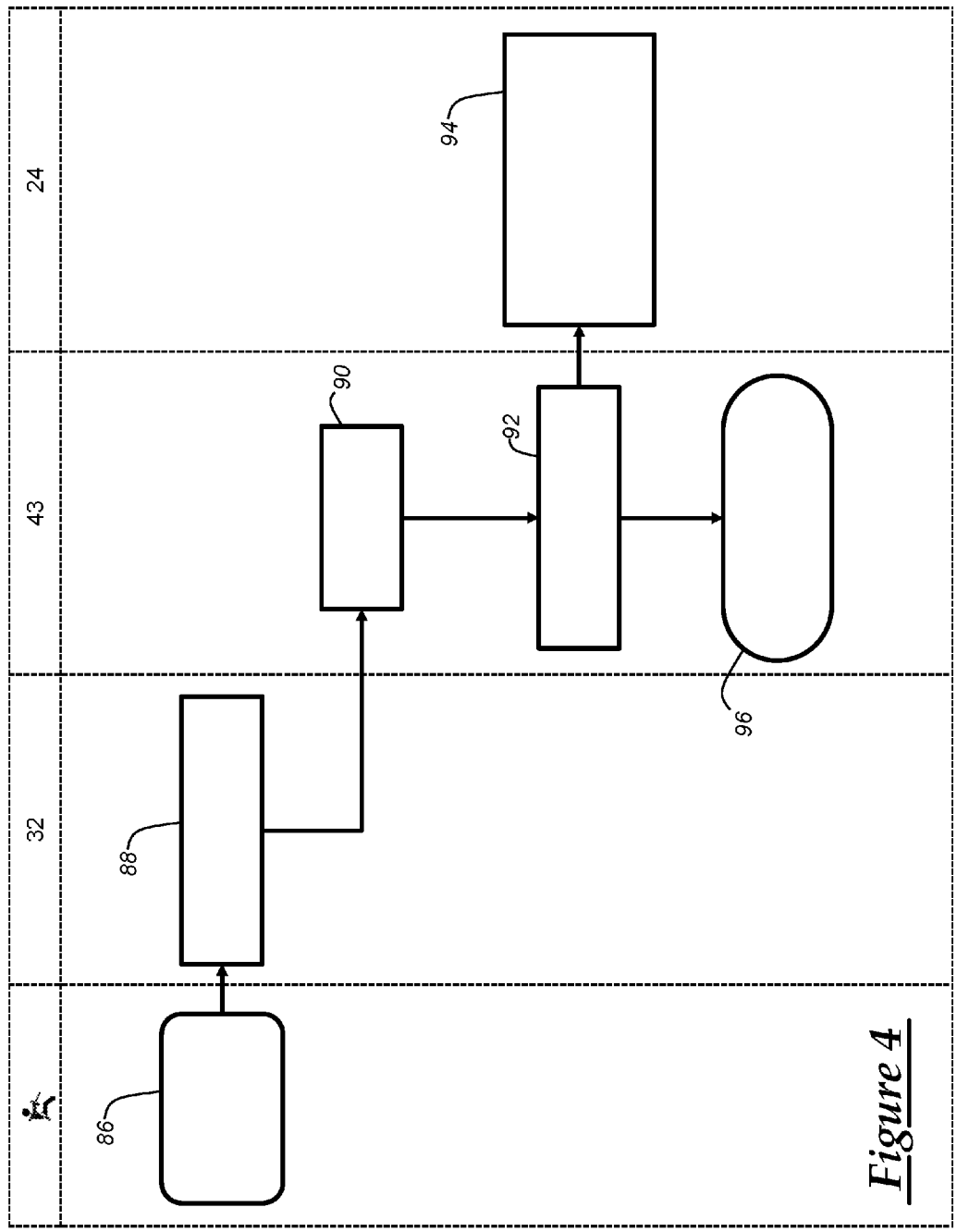
FIG. 4 is a flowchart of a method of discontinuing the communication established in the method of FIG. 3.

Turning now to FIG. 4, there is shown a flowchart of the disconnection process that may be carried out when the user removes the mobile device 32 from the holder 34. Once the process of FIG. 3 has been carried out and communication established between the mobile device 32 and infotainment system 24 via the communication module 43, data may be sent back and forth as desired or necessary. Then, upon the user removing the mobile device 32 from the holder 34 or otherwise disabling the NFC communication, as indicated at steps 86 and 88, the communication module 43 detects at step 90 that NFC traffic is no longer present or possible and the NFC communication channel is therefore no longer present. In response to this, the BLE module severs (terminates) the BLE communication channel at step 92 and then at step 96 waits or monitors for new NFC traffic as a result of the mobile device 32 or another NFC-capable mobile device to be placed within range of the NFC module 45. Also, the BLE module 52 of infotainment device 24 returns to scanning for BLE advertisements from the BLE module 46 or elsewhere. In the event that the communication module 43 was used to provide an initial pairing PIN from the mobile device to the infotainment system, the BLE module 52 may, following step 94, then discover the mobile device 32 BLE transmissions and carry out the automatic pairing using the stored PIN. Direct Bluetooth™ communication between the mobile device 32 and infotainment system 24 may then commence.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for providing wireless communication between a handheld mobile device and an embedded vehicle system of a motor vehicle, wherein the vehicle includes a communication module configured to carry out wireless communication with the mobile device using a first communication channel and to carry out wireless communication with the embedded vehicle system using a second communication channel, the method comprising the steps of:
   (a) detecting the presence of the mobile device in the vehicle using the communication module of the motor vehicle, wherein the vehicle includes a holder configured to support the handheld mobile device, wherein the communication module is installed in the vehicle in a location adjacent to the holder such that the handheld mobile device, when placed in or on the holder, is within an operational range of transmissions that are sent by the communication device according to a first protocol so that the handheld mobile device and communication module can communicate via the first protocol using the first communication channel, and wherein, when the handheld mobile device is placed in or on the holder, the embedded vehicle system is located outside of the operational range of transmissions that are sent by the handheld mobile device according to the first protocol;
   (b) establishing the first communication channel with the mobile device using wireless communication between the communication module and mobile device according to the first protocol, wherein the first protocol supports the transmission of data comprising (i) commands, (ii) information, (iii) media content, or any combination of (i), (ii), and (iii) over the first communication channel;
   (c) establishing the second communication channel between the communication module and the embedded vehicle system using wireless communication according to a second, different protocol that supports the transmission of the data over the second communication channel, wherein the second communication channel is secured through use of a secure pairing or connection process using encryption between the communication module and the embedded vehicle system, and wherein the first protocol is used to transmit wireless messages a short distance such that the first protocol is inherently secure; and
   (d) securely transferring at least some of the data between the mobile device and the embedded vehicle system via communication between the communication module and mobile device over the first communication channel using the first protocol and via communication between the communication module and the embedded vehicle system over the second communication channel using the second, different protocol so as to allow the secure transfer of the at least some of the data between the handheld mobile device and the embedded vehicle system without using encryption between the handheld mobile device and either the embedded vehicle system or the communication module.

2. The method set forth in claim 1, wherein step (b) occurs after step (c).

3. The method set forth in claim 1, wherein step (c) is carried out in response to step (a) or step (b).

4. The method set forth in claim 1, wherein step (d) further comprises receiving over the first communication channel application data sent from an application running on the mobile device and transferring the application data to the embedded vehicle system over the second communication channel.

5. The method set forth in claim 4, further comprising the steps of receiving a command for the application at the embedded vehicle system and transferring the command via the communication module and first and second communication channels to the mobile device for use by the application.

6. The method set forth in claim 1, further comprising the steps of detecting loss of the first communication channel and, in response thereto, severing the second communication channel.

7. The method set forth in claim 1, wherein the first communication channel utilizes Near Field Communication (NFC) and the second communication channel utilizes Bluetooth™ communication.

8. The method set forth in claim 7, further comprising the step of sending NFC communications received from the mobile device at the communications module within one or more Bluetooth™ payloads sent from the communications module to the embedded vehicle system.

9. The method set forth in claim 7, wherein the embedded vehicle system is an infotainment system, and wherein step (d) further comprises receiving infotainment content from the mobile device for playback by the infotainment system to one or more occupants in the vehicle, wherein the infotainment content is received by the communication module via the first communication channel and is sent to the infotainment system via the second communication channel.

10. The method set forth in claim 1, further comprising, prior to step (d), the steps of obtaining an identifier of the mobile device at the communication module using the first communication channel, sending the mobile device identifier to the embedded vehicle system using the second communication channel, and authorizing access to the embedded vehicle system by the mobile device based on the identifier.

11. A method for providing wireless communication between a mobile device and an infotainment system of a motor vehicle, wherein the vehicle includes a communication module configured to carry out wireless communication with the mobile device using a first communication channel that utilizes a first protocol and to carry out wireless communication with the infotainment system using a second communication channel that utilizes a second, different protocol, wherein the first communication channel utilizes Near Field Communication (NFC), the method comprising the steps of:
   establishing the first communication channel between the mobile device and the communication module of the motor vehicle using the first protocol;
   obtaining an identifier of the mobile device at the communication module using the first communication channel;
   transmitting the identifier of the mobile device from the communication module to the infotainment system using the second communication channel;
   authorizing the mobile device for use with the infotainment system using the identifier of the mobile device received from the communication module, which includes pairing the infotainment system with the mobile device via the communication module using the first and second communication channels; and
   wirelessly communicating with the mobile device using infotainment system based on the authorization, which includes directly receiving content at the infotainment system from the mobile device over a third communication channel that is established by the pairing between the infotainment system and mobile device.

12. The method set forth in claim 11, wherein the step of wirelessly communicating with the mobile device further comprises receiving content at the infotainment system that is sent from the mobile device through the first and second communication channels using the communication module.

13. The method set forth in claim 11, wherein the second communication channel utilizes Bluetooth™ communication.

14. The method as set forth in claim 11, wherein the second communication channel utilizes WiFi communication.

15. A method for providing wireless communication between a mobile device and an infotainment system of a motor vehicle, wherein the vehicle includes a communication module configured to carry out wireless communication with the mobile device using a first communication channel that utilizes a first protocol and to carry out wireless communication with the infotainment system using a second communication channel that utilizes a second, different protocol, the method comprising the steps of:
   establishing the first communication channel between the mobile device and the communication module of the motor vehicle using the first protocol;
   obtaining an identifier of the mobile device at the communication module using the first communication channel;
   transmitting the identifier of the mobile device from the communication module to the infotainment system using the second communication channel;
   authorizing the mobile device for use with the infotainment system using the identifier of the mobile device received from the communication module; and
   wirelessly communicating with the mobile device using infotainment system based on the authorization;
   wherein the authorizing step comprises pairing the infotainment system with the mobile device via the communication module using the first and second communication channels, and wherein the step of wirelessly communicating with the mobile device further comprises directly receiving content at the infotainment system from the mobile device over a third communication channel that is established by the pairing between the infotainment system and mobile device;
   wherein the first communication channel utilizes Near Field Communication and the second communication channel utilizes Bluetooth™ communication; and
   wherein the third communication channel utilizes Bluetooth™ communication between the infotainment system and mobile device, and wherein the second communication channel is terminated during use of the third communication channel by the infotainment system when receiving the content from the mobile device.

* * * * *